(12) United States Patent
Gerber et al.

(10) Patent No.: US 11,464,242 B2
(45) Date of Patent: Oct. 11, 2022

(54) FLAVOR BLENDING SYSTEM

(71) Applicant: Flavor Burst Co., LLP, Danville, IN (US)

(72) Inventors: Thomas J. Gerber, Avon, IN (US); Timothy Gerber, Danville, IN (US)

(73) Assignee: Flavor Burst Co., LLP, Danville, IN (US)

( * ) Notice: Subject to any disclaimer, the term of this patent is extended or adjusted under 35 U.S.C. 154(b) by 457 days.

(21) Appl. No.: 16/706,139

(22) Filed: Dec. 6, 2019

(65) Prior Publication Data

US 2020/0178560 A1   Jun. 11, 2020

Related U.S. Application Data

(60) Provisional application No. 62/776,173, filed on Dec. 6, 2018.

(51) Int. Cl.
   *A23G 9/28*   (2006.01)
   *A23G 9/22*   (2006.01)
   *A23G 9/30*   (2006.01)
   *A23G 9/12*   (2006.01)

(52) U.S. Cl.
   CPC ............... *A23G 9/282* (2013.01); *A23G 9/12* (2013.01); *A23G 9/224* (2013.01); *A23G 9/30* (2013.01)

(58) Field of Classification Search
   CPC .......... A23G 9/282; A23G 9/12; A23G 9/224; A23G 9/30; A23G 9/28; A23G 9/22
   See application file for complete search history.

(56) References Cited

U.S. PATENT DOCUMENTS

| | | | | |
|---|---|---|---|---|
| 3,224,740 | A * | 12/1965 | Kuehn | A23G 9/04 366/184 |
| 6,319,532 | B1 * | 11/2001 | Pineault | A23G 9/283 222/386 |
| 7,178,976 | B2 | 2/2007 | Gerber | |
| 7,621,669 | B1 | 11/2009 | Gerber | |
| 7,665,398 | B2 | 2/2010 | Gerber | |
| 8,403,179 | B1 | 3/2013 | Gerber | |
| 2007/0110872 | A1 * | 5/2007 | Gerber | B01F 27/923 426/565 |
| 2016/0324185 | A1 * | 11/2016 | Elsom | A23G 9/282 |

OTHER PUBLICATIONS

Equipment, Maintenance and Operations Manual for Flavor Burst Frozen Beverage System, Model CTP 80 BEV, Oct. 2016.

(Continued)

*Primary Examiner* — Emmanuel E Duke
(74) *Attorney, Agent, or Firm* — Woodard, Emhardt, Henry, Reeves & Wagner, LLP

(57) ABSTRACT

Devices and systems for dispensing flavored, frozen flowable foods are disclosed. Such devices and systems may include a flavor injection and blending assembly having an inner surface that tapers inwardly near an outlet end to form a nozzle that aids in coalescing strands of frozen flowable confection, formed during mixing, into a unitary form. Flavor injection and blending assemblies having a first mixing vane and a second mixing vane welded to one another are disclosed. Sanitizing systems configured to provide water to a flavor injection and blending assembly are also disclosed.

20 Claims, 13 Drawing Sheets

(56) References Cited

OTHER PUBLICATIONS

Equipment, Maintenance and Operations Manual for Flavor Burst Frozen Beverage System, Model CTP 80FCB, Sep. 2015.
Equipment, Maintenance and Operations Manual for Flavor Burst Premium Blended Beverage System, Model CTP 80CBB, May 2019.
Equipment, Maintenance and Operations Manual for Flavor Burst Soft Serve Blend System, Model CTP 80BLD, Equipment, Maintenance and Operations Manual. Jul. 2018.
Operations Manual Supplement for Flavor Burst Dual Spout Expanation Base-2S, Models CTP Base ss-2S, CTP Base BLD-2S, CTP Base BEV-2S, CTP Base FCB-2S Oct. 2016.

* cited by examiner

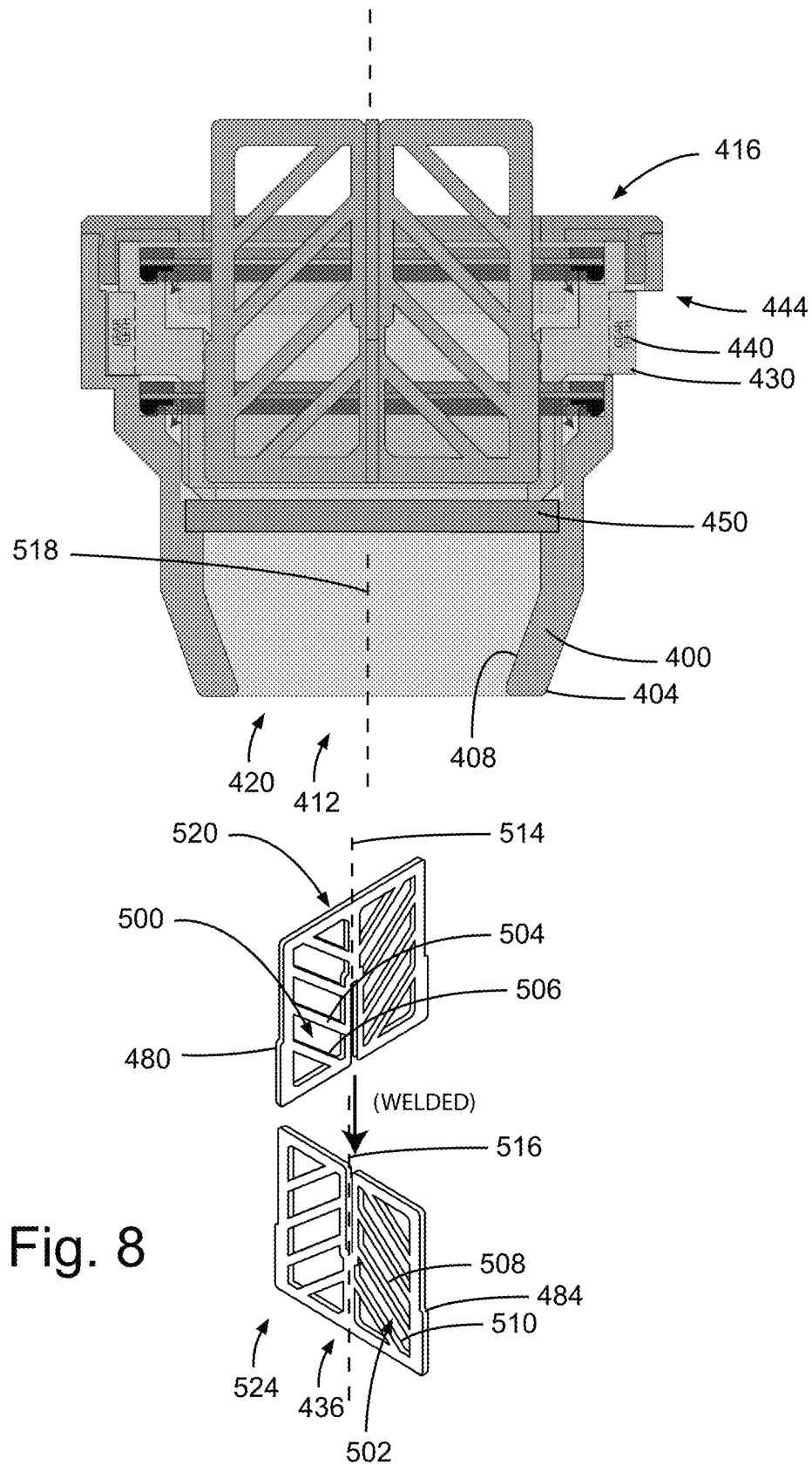

FLAVOR BLENDING SYSTEM

FIELD OF THE INVENTION

This application relates generally to devices and systems for dispensing flavored, frozen flowable foods to a customer for soft-serve ice cream, ice milk, ices, smoothies, slushes, shakes or the like.

BACKGROUND

Frozen flowable confections, such as soft serve ice cream, are often dispensed from a frozen confection freezer. The freezer often receives product in a mix form and then freezes and dispenses the product for consumption. Mixes often come in either vanilla or chocolate. Accordingly, such machine dispensers provide a limited set of options such as vanilla, chocolate, or swirl—which is a combination of vanilla and chocolate.

For additional flavors beyond these limited options, Applicant has developed systems that add dry food ingredient in solid particulate form to the frozen confection flowing from the freezer, such as that described in U.S. Pat. No. 7,665,398. Applicant also sells a system marketed under the name Flavor Burst® which adds a flavor gel material around the outside of the frozen confection flowing from the freezer in a striping fashion. There is a desire, however, for new systems for adding and blending flavors into frozen confection flowing from a freezer and that are capable of producing a product that is visually appealing.

SUMMARY

Flavors can be added into a chocolate, vanilla, or other frozen flowable confection base mix, such as soft serve ice cream, by hand blending, use of an auger, or the addition of a flavor gel material around the outside of the ice cream, such as Applicant's Flavor Burst® commercially marketed product. Unfortunately, however, Applicant has found these methods do not create a homogenous uniform blend of the added flavor through the ice cream. Rather, hand blending and auger blending create a marble pattern in the ice cream with the added flavor, and the addition of flavor gel material also produces a heterogeneous product. Applicant believes frozen confections having a homogenous appearance can be more visually appealing to some consumers than a marble pattern. Accordingly, Applicant believes there is a need for a device capable of creating a homogenous uniform blend of flavoring into a frozen flowable confection.

The devices of the present disclosure can be used for frozen flowable confections, such as soft serve ice cream, slushes, and/or shakes. Historically, ice cream has required different flavoring assemblies than slushes and shakes due to ice cream having a higher viscosity than slushes and shakes. Advantageously, the devices and assemblies of the present disclosure can provide a universal system for adding flavor to a variety of frozen flowable confections (e.g., soft-serve ice cream, ice milk, ices, smoothies, slushes, shakes or the like).

Further forms, objects, features, aspects, benefits, advantages, and embodiments of the present invention will become apparent from a detailed description and drawings provided herewith.

BRIEF DESCRIPTION OF THE DRAWINGS

FIG. 7 is a cross-sectional view of the blend cartridge of FIG. 5.

FIG. 8 is an exploded view of the mixing vane assembly if FIG. 5.

DESCRIPTION OF THE SELECTED EMBODIMENTS

Figure 1:
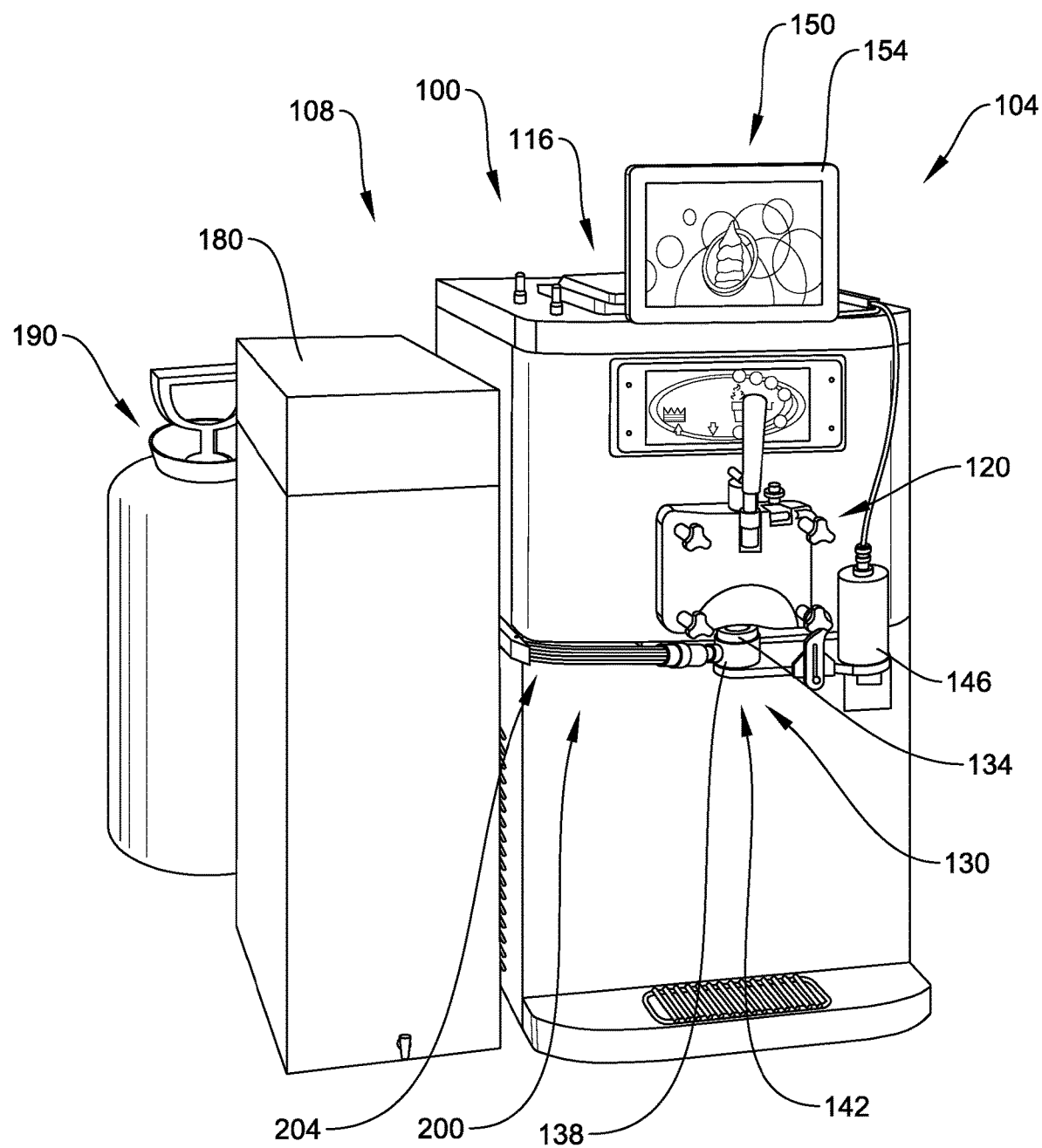
FIG. 1 is a perspective view of an assembly comprising a frozen consumable freezer and a flavor system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. An embodiment of the invention is shown in great detail, although it will be apparent to those skilled in the relevant art that some features that are not relevant to the present invention may not be shown for the sake of clarity.

With respect to the specification, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described and/or illustrated features to a specific direction and/or orientation.

The drawing figures referred to herein are provided for illustrative purposes only. They should not be construed as limiting the scope of the invention, including that they may not necessarily be drawn to scale.

FIG. 1 illustrates an assembly 100 comprising a frozen consumable freezer 104 and a flavor system 108. The frozen consumable freezer is arranged to dispense a frozen consumable, such as soft-serve ice cream. The frozen consumable freezer includes a hopper 116 in communication with a freezer cylinder/barrel having a beater positioned therein and communicating with a door assembly 120 having a valve and a spout. During use, mix flows from the hopper into the freezer cylinder/barrel where it is frozen. Rotation of the beater positioned within the freezer cylinder/barrel pushes the frozen flowable mix into the door assembly where it can pass through the valve and the spout when the valve is actuated.

The flavor system can comprise a flavor injection and blending assembly 130 attachable to the spout of the frozen consumable freezer. The flavor injection and blending assembly is arranged to provide additional flavoring into the frozen flowable material (i.e., confection) that is extruded from the spout of the freezer. The flavor injection and blending assembly can include a spout adaptor 134, an injector head 138, a blend cartridge 142, a drive motor 146, and a control panel 150.

The control panel is arranged to control operation of the drive motor and one or more pumps of the flavor system, as will be described below. The control panel can be configured and arranged for allowing a user to select flavor(s) to add to the consumable material extruded from the frozen consumable freezer. For example, the control panel can include a touch-screen 154 that displays various flavors and/or flavor combinations.

The flavor system can also include a flavor cabinet 180 and a sanitizer system 190. Syrup lines 200 extend from the flavor cabinet to the flavor injection and blending assembly, and a water flush line 204 extends from the sanitizer system to the flavor cabinet and/or the flavor injection and blending assembly.

Figure 2:
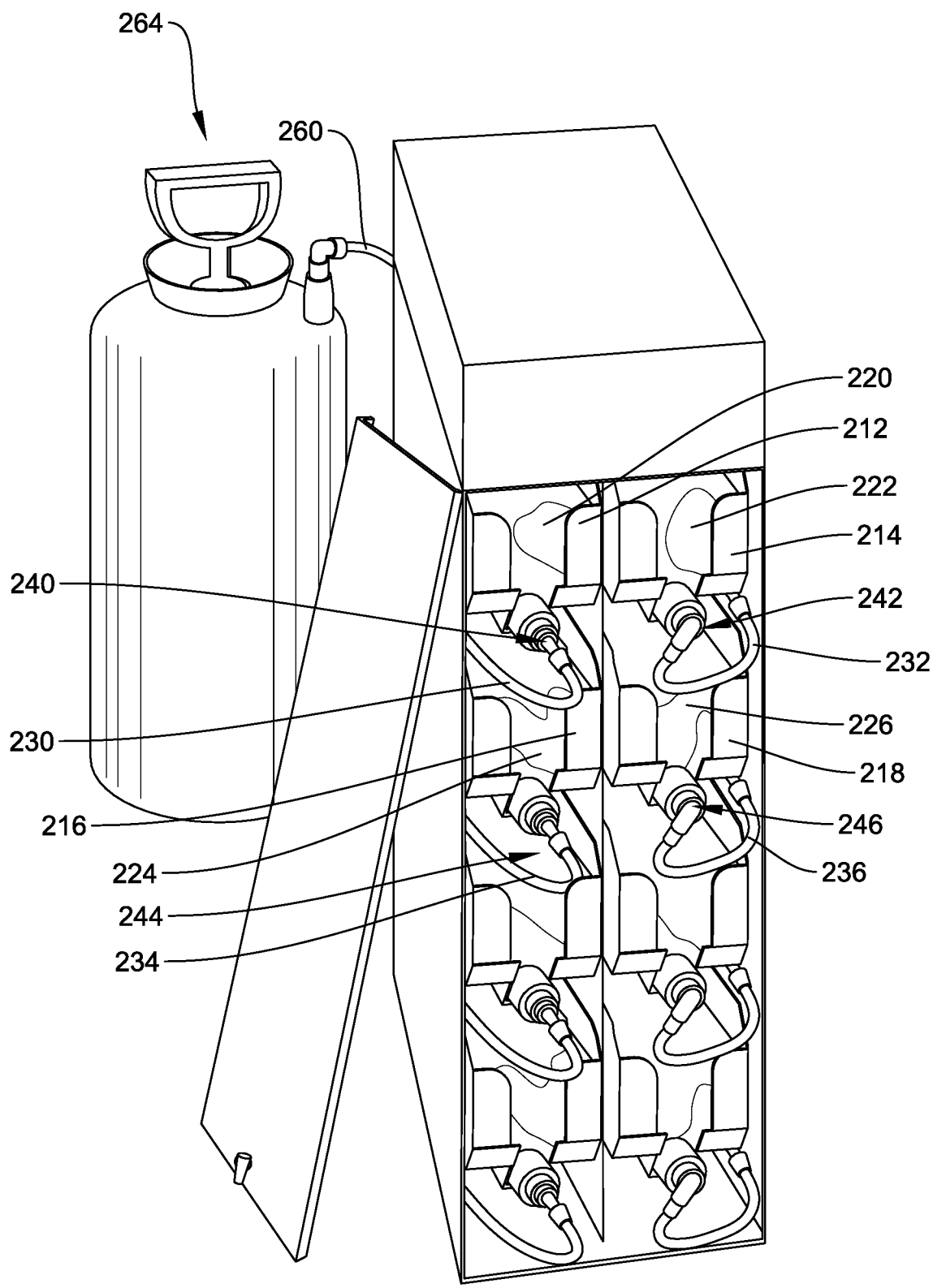
FIG. 2 is a perspective view of a flavor cabinet and sanitizer tank.

FIG. 2 illustrates the flavor cabinet and sanitizer tank of FIG. 1. Inside the flavor cabinet are a series of trays 212, 214, 216, and 218 configured and arranged to hold syrup bags 220, 222, 224, and 226. Each tray and/or syrup bag is associated with a syrup line 230, 232, 234, and 236 extending to the flavor injector head of the flavor injection and blending assembly. At the end of each syrup line in the flavor cabinet is a connector 240, 242, 244, and 246 arranged to detachably connect the flavor line to the syrup bag. The connector can be a quick-connect type connector. Additionally, the flavor cabinet may include a pump (not shown) associated with each flavor line. The pump can be configured and arranged to pump syrup from the syrup bag through the syrup line and towards the flavor injection and blending assembly. Similarly, the sanitizer tank is connected to a water flush line 260 in fluid communication with a pump 264 (e.g., a self-priming pump) and the flavor injection and blending assembly.

Figure 3:
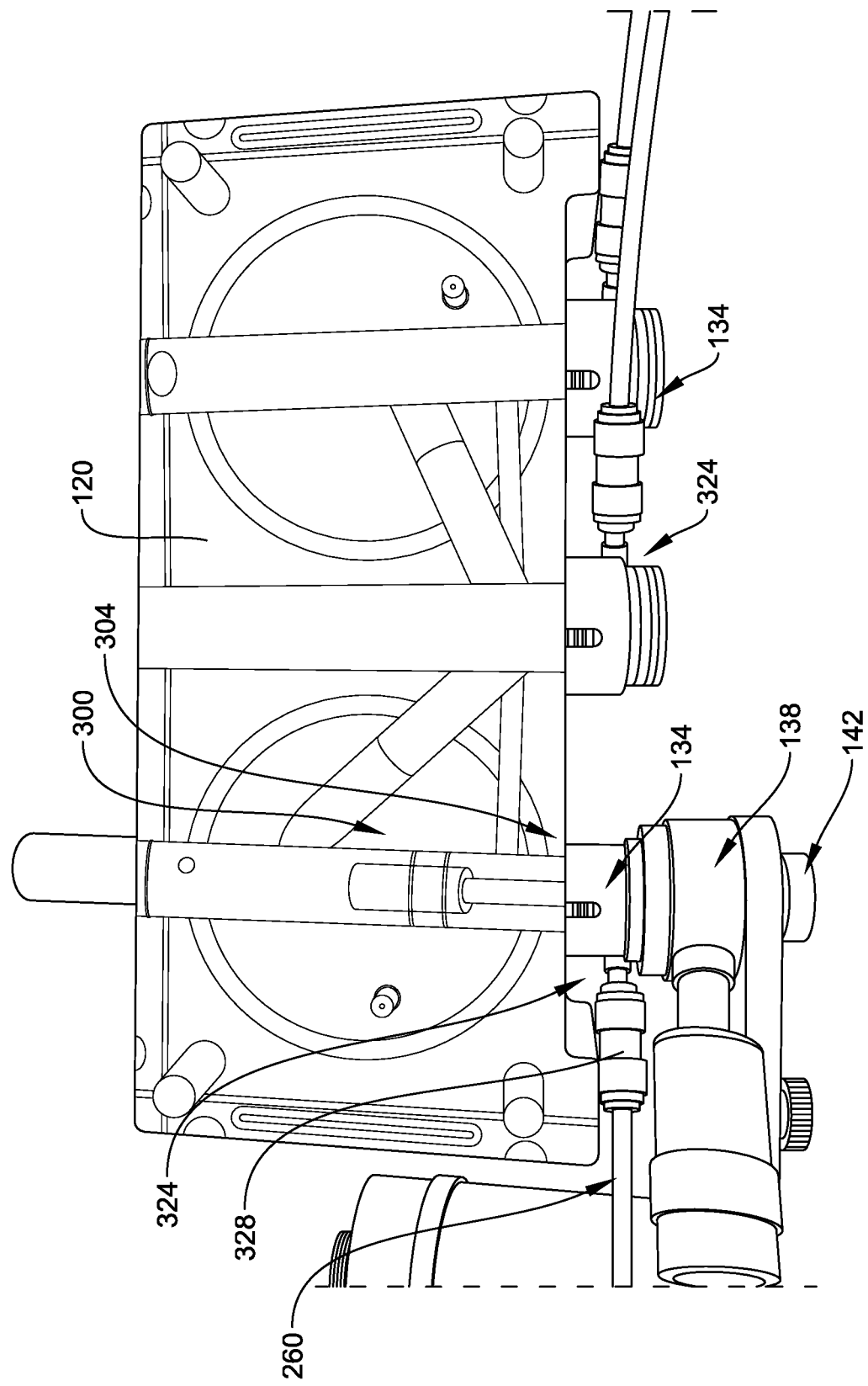
FIGS. 3 and 4 are front views of a door of a freezer and flavor injection and blending assembly.
Figure 4:
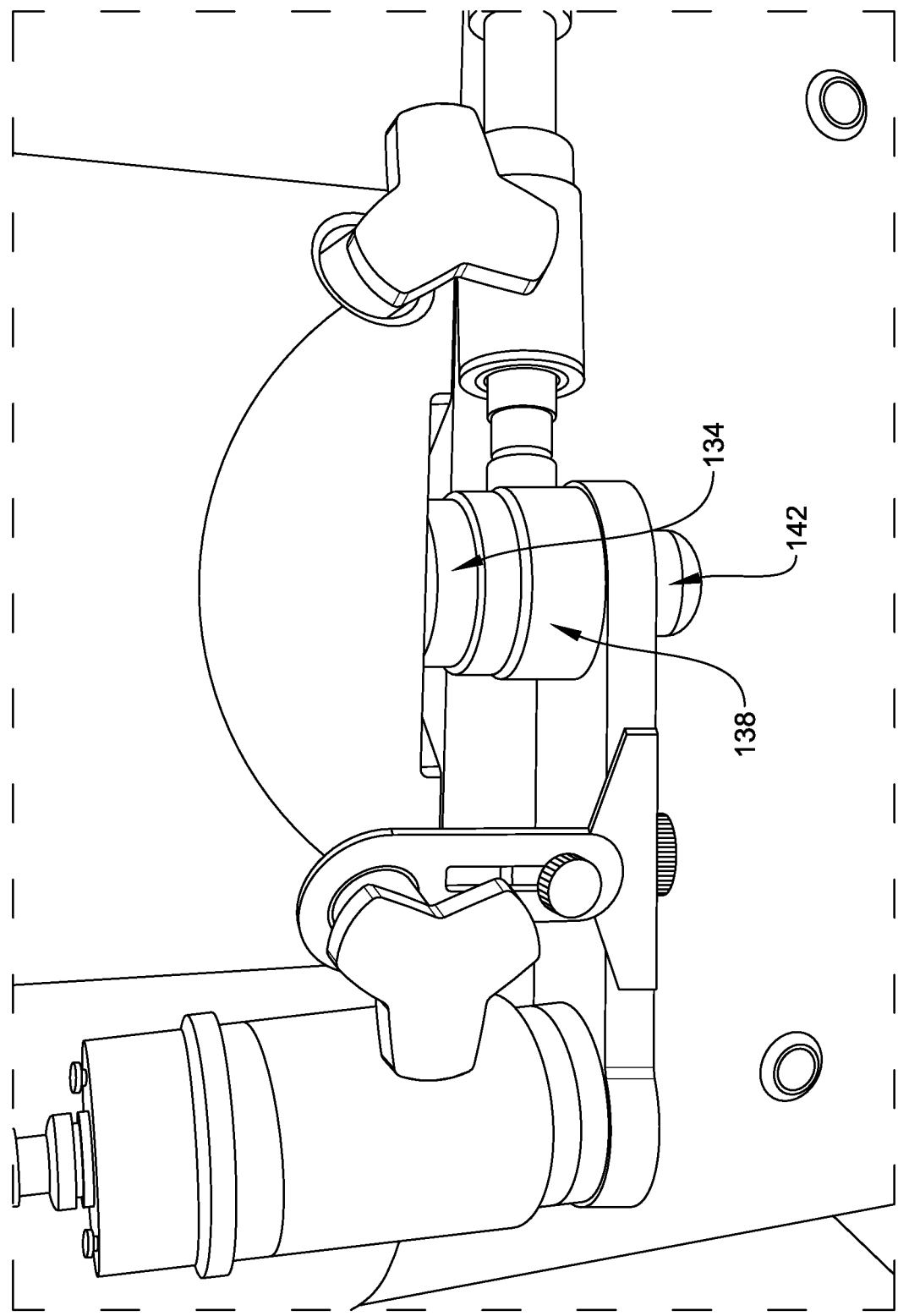

Referring now to FIGS. 3 and 4, the door assembly of the frozen consumable freezer has one or more valves 300 and one or more spouts 304 for dispensing a frozen consumable from the freezer. Each valve is in communication with a freezing cylinder/barrel of the freezer. As mentioned above, freezing cylinder/barrel houses a beater, wherein the frozen consumable in liquid form enters the freezing cylinder/barrel where it is frozen, and the beater advances the frozen consumable into the door assembly.

Connected to the spout of the freezer is the spout adaptor 134. The spout adaptor is arranged to couple the flavor system to the spout of the freezer. The spout adaptor may include a port 324 to receive water from the water flush tube of the sanitizer system. The port and/or water flush tube may include a connector 328 (e.g., a quick-connect type connector) arranged to connect and/or disconnect the water flush tube from the spout adaptor.

Coupled to the spout adaptor and positioned downstream thereto is the flavor injector head 138. The flavor injector head is configured and arranged to inject flavoring (e.g., additional flavoring) into consumable material passing through the flavor injection and blending assembly. Specifically, the flavor injector head is connected to the syrup lines and is arranged to provide syrup from the syrup lines into the stream of consumable material passing through the flavor injector head. Accordingly, the syrup lines can extend from the flavor cabinet to the flavor injector head. In some instances, the flavor injector head is also connected to a water flush line of the sanitizing system, such as one extending parallel to the syrup lines.

Positioned downstream from the flavor injector head is the blend cartridge 142. The blend cartridge is configured and arranged to receive frozen consumable material and added flavoring (e.g., syrup) from the flavor injector head and blend the frozen flowable material and the syrup into a mixture. Preferably the blend cartridge blends the frozen flowable material and syrup into a homogenous confection.

As will be discussed in more detail below, the blend cartridge can include mixing vanes, a screen, and a nozzle configured to form the confection into a visually appealing arrangement of homogenous blend. The blend cartridge can attach to the bottom of the flavor injector head. In some instances, a portion of the blend cartridge is positioned within a portion of the flavor injector head. For example, a portion of the mixing vanes may extend into the bottom of the flavor injection head.

Figure 5:
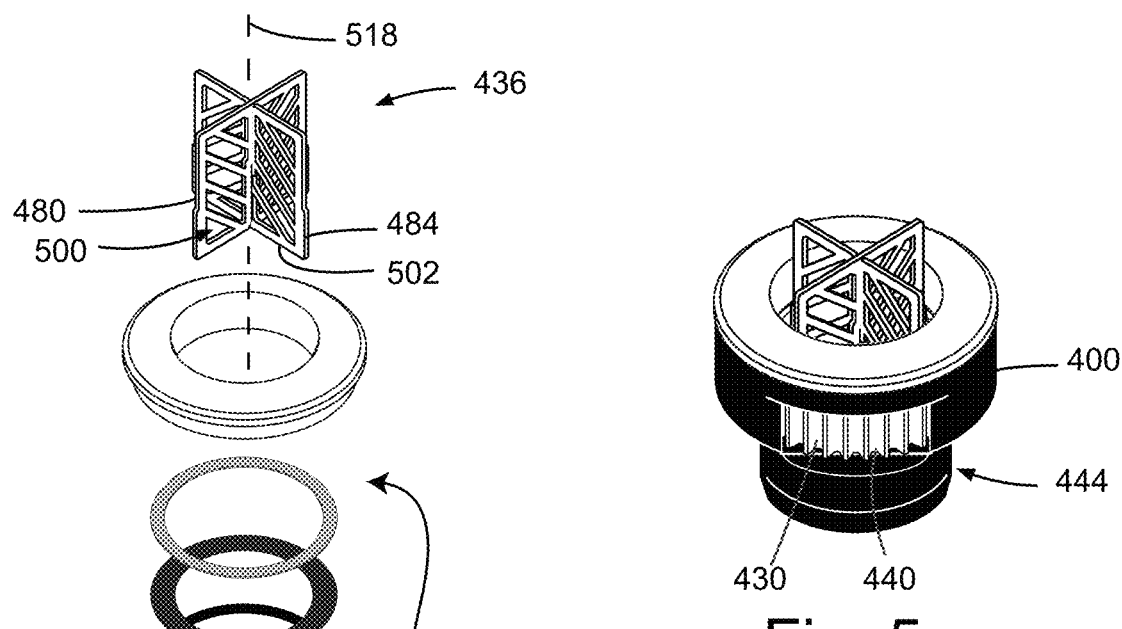
FIG. 5 is a perspective view of a blend cartridge.
Figure 6:
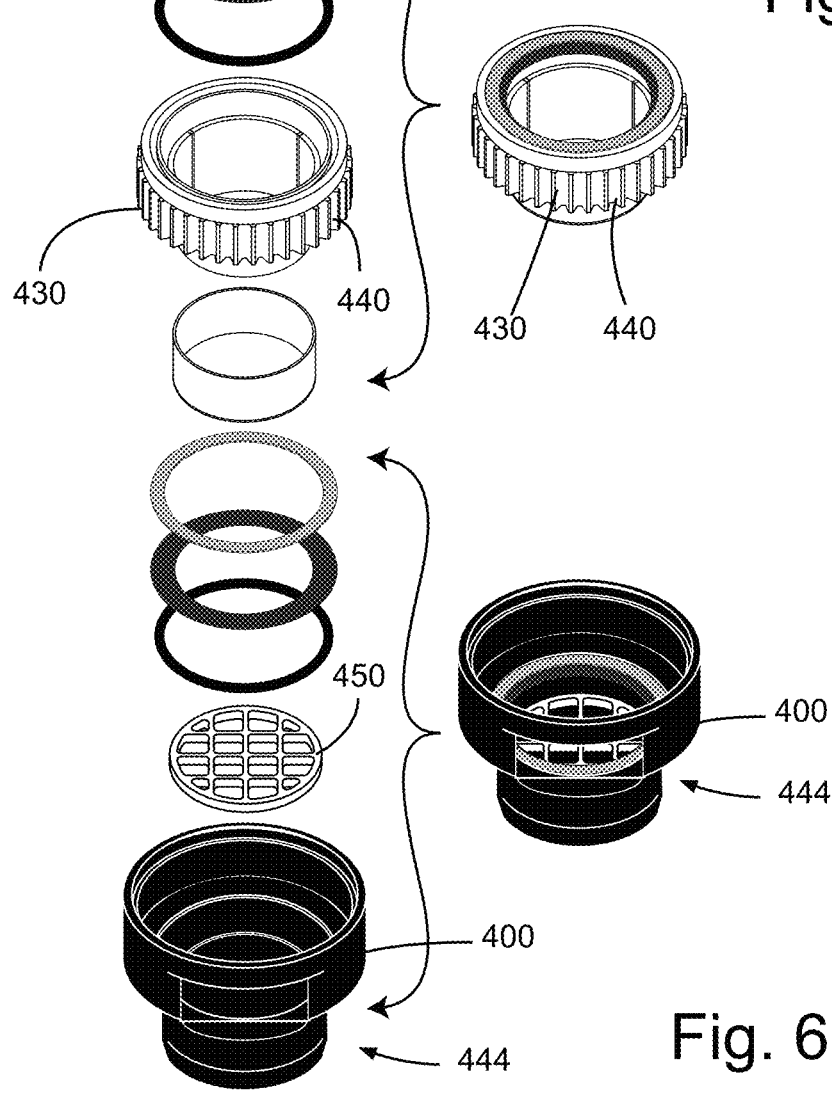
FIG. 6 is an exploded view of the blend cartridge of FIG. 5.

FIGS. 5, 6, and 7 illustrate the blend cartridge 142. The blend cartridge has a blend cartridge housing 400 having an outer surface 404 and inner surface 408 defining a confection passageway 412. The confection passageway extends from an inlet end 416 to an outlet end 420 of the blend cartridge housing.

The blend cartridge includes a gear ring 430 coupled to a mixing vane assembly 436. The gear ring has a plurality of gear teeth 440 extending around the periphery thereof. When the gear ring is positioned within the blend cartridge housing, the gear teeth are exposed in an opening 444 of the blend cartridge housing.

The gear ring is arranged to rotate the mixing vane assembly when the gear ring is rotated. When assembled in the flavor injection and blending assembly, the gear teeth of the gear ring are arranged to receive rotational force from the drive motor so as to rotate the mixing vane assembly positioned within the blend cartridge.

Positioned downstream (e.g., beneath) the mixing vane assembly is a screen 450. The screen can be arranged to at least partially remove or reduce the turbulent flow/motion or spin of frozen material caused by the mixing vane assembly. Preferably, the screen is arranged to direct the frozen flowable material in a more linear direction out of the blend cartridge. Additionally or alternatively, the screen can be arranged to protect objects, such as fingers, from contacting the mixing vane assembly if inserted into the outlet end of the blend cartridge.

The inner surface of the blend cartridge housing tapers inwardly near the outlet end so as to form a nozzle. Applicant has observed that frozen flowable material passing through the screen can separate into strands, similar to spaghetti. Advantageously, the nozzle can aid in coalescing strands of frozen flowable confection into a unitary form. Additionally, the nozzle can aid in removing gaps in the outer surface of the confection, which can aid in visual appearance.

Turning now to FIGS. 6 and 8, the mixing vane assembly may include a first mixing vane 480 and a second mixing vane 484 positioned transverse (e.g. orthogonal) to one another. Each mixing vane of the mixing vane assembly includes at least one opening 500 and 502 defined by a plurality of struts 504, 506, 508, 510. The openings and/or struts may be elongate and may extend in one or more directions. For example, the struts of each mixing vane may extend upwardly or downwardly from a centerline 514, 516 of the mixing vane. Preferably, struts of one mixing vane extend in a direction opposite that of struts of another mixing vane. In the illustrated embodiment, struts (e.g., struts 504, 506) of the first mixing vane 480 extend upwardly from the centerline 514 of the first mixing vane, and struts (e.g., struts 508, 510) of the second mixing vane 484 extend downwardly from the centerline 514 of the second mixing vane. In this and similar arrangements, the struts and/or openings of adjacent mixing vanes form a crisscross and/or crosshatch arrangement in the frozen material as the mixing vanes spin around a longitudinal axis 518 of the mixing vane assembly. Additionally or alternatively, openings and/or struts of one mixing vane may be vertically and/or radially offset from openings and/or struts of an adjacent mixing vane such that frozen material passing through an opening in one mixing vane encounters a strut of another mixing vane as the mixing vane assembly spins through frozen material. Advantageously, such cross-hatch arrangements can aid in blending flavor syrup homogenously into the frozen material.

The first mixing vane may be of a first mixing vane panel 520 and the second mixing vane may be of a second mixing vane panel 524. The first and second mixing vanes and/or mixing vane panels are preferably fixedly coupled to one another (e.g., welded). Accordingly, the mixing vane assembly can be a rigid assembly. The first mixing vane panel and the second mixing vane panel may be mirror images of one another. In some instances, the first mixing vane panel is flipped/reversed with respect to the other such that the openings and/or struts extending in opposing directions to the other mixing vane panel.

Figure 9:
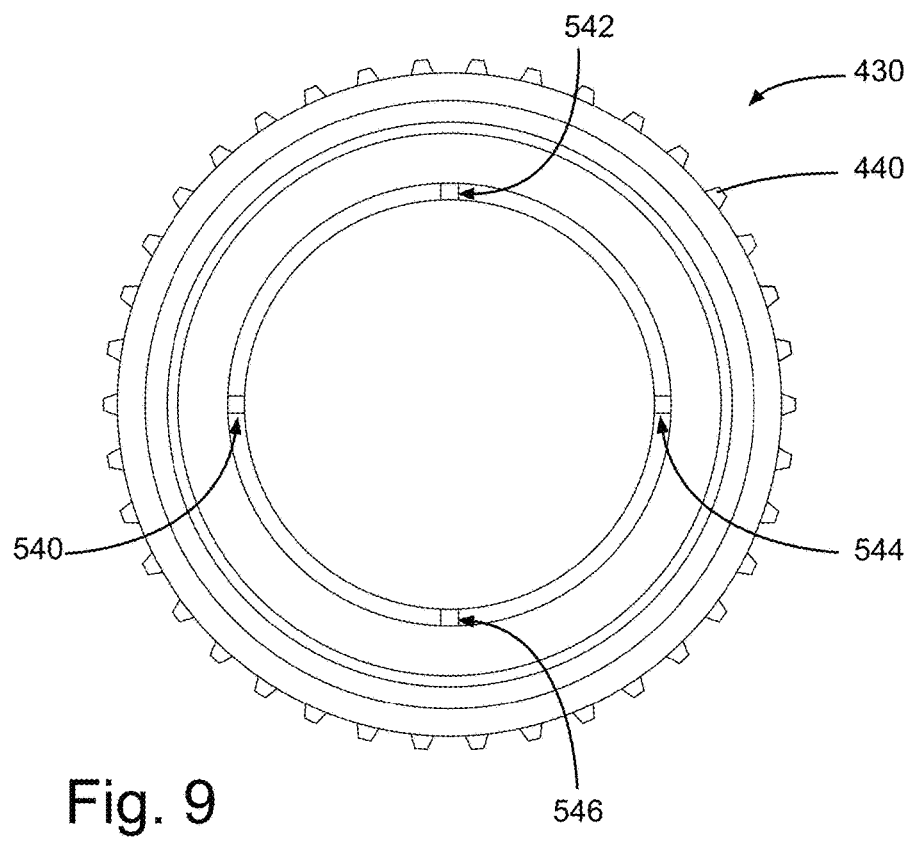
FIG. 9 is a top, plan view of the ring gear of FIG. 5.

FIG. 9 is a top view of the gear ring of the blend cartridge. The gear ring includes one or more grooves 540, 542, 544, and 546 arranged to receive mixing vanes of the mixing vane assembly. When positioned in the grooves, rotation of the gear ring around the longitudinal axis rotates the mixing vanes around the longitudinal axis.

Figure 10:
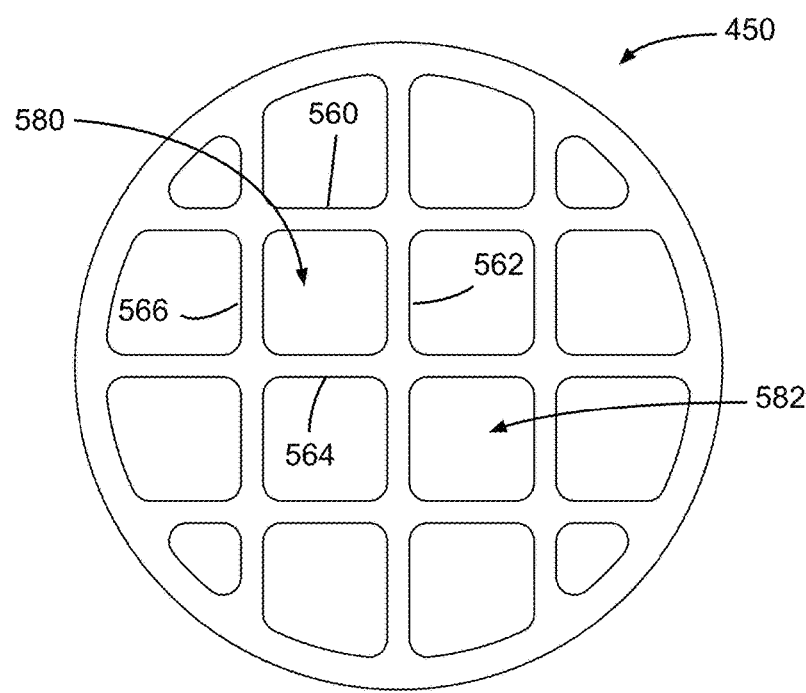
FIG. 10 is a top, plan view of the screen of FIG. 5.

FIG. 10 illustrates a top view of the screen of the blend cartridge. The screen can have a plurality of struts 560, 562, 564, 566 defining a plurality of openings 580, 582. The openings are arranged to receive frozen consumable material passing through the blend cartridge. As mentioned above, the screen is preferably arranged to at least partially remove or reduce the turbulent flow/motion or spin of frozen material caused by the mixing vane assembly; to direct the frozen flowable material in a more linear direction out of the blend cartridge; and/or to protect objects, such as fingers, from contacting the mixing vane assembly if inserted into the outlet end of the blend cartridge.

Figure 11:
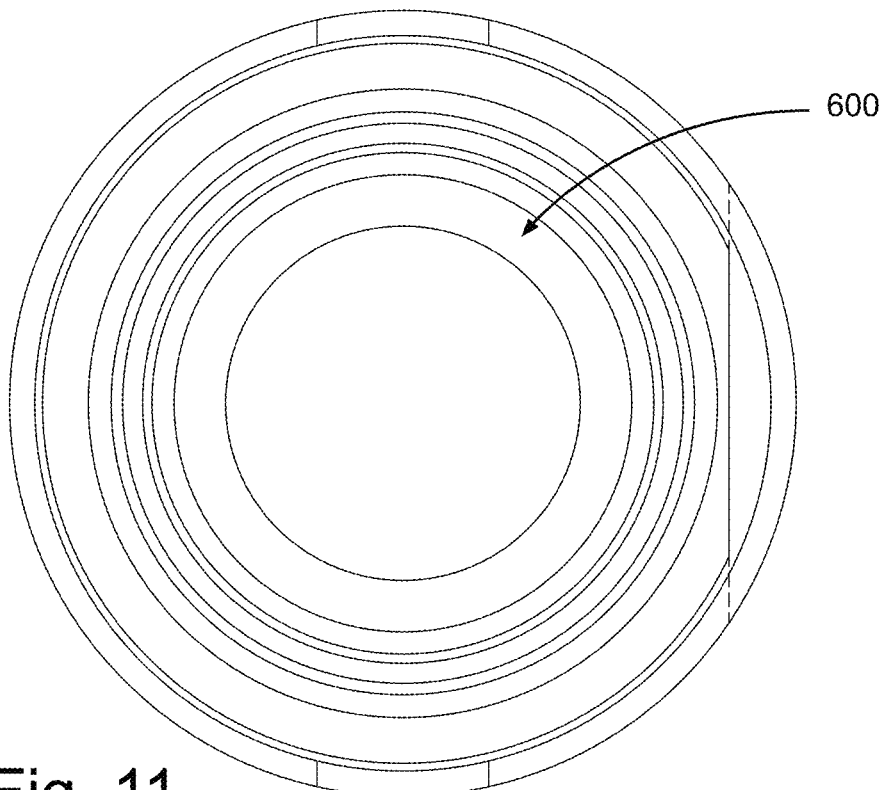
FIG. 11 is a top, plan view of the blend cartridge housing of FIG. 5.
Figure 12:
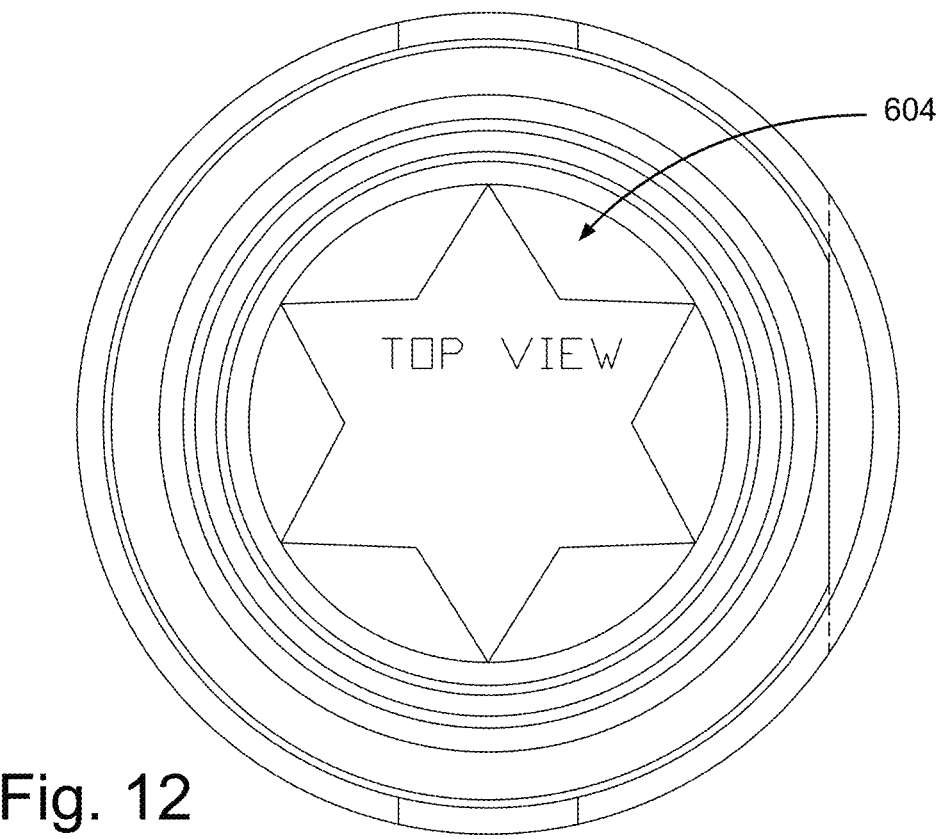
FIG. 12 is a top, plan view of an alternative blend cartridge housing.

FIG. 11 illustrates a top view of the blend cartridge housing. The blend cartridge housing can define a circular outlet opening 600 so that consumable material exiting the blend cartridge has a circular cross-section. FIG. 12 illustrates a top view of an alternative embodiment of the blend cartridge housing wherein the outlet opening 604 of the blend cartridge housing is in the shape of a star so the extruded frozen flowable material has a star cross-section when exiting the blend cartridge. It is also envisioned that various caps having different cross-sectional shape and/or size openings may be attachable to the blend cartridge. Accordingly, each cap provides a different cross-sectional shape for the flowable frozen confection exiting the flavor system.

Figure 13:
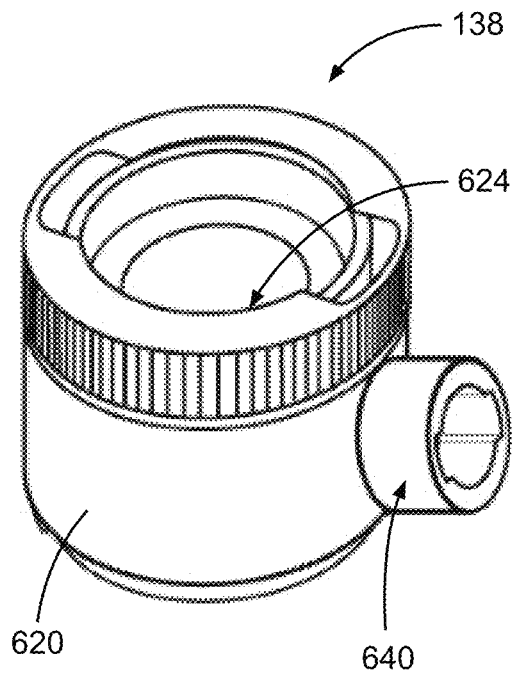
FIGS. 13 and 14 are perspective views of the flavor injector head.
Figure 14:
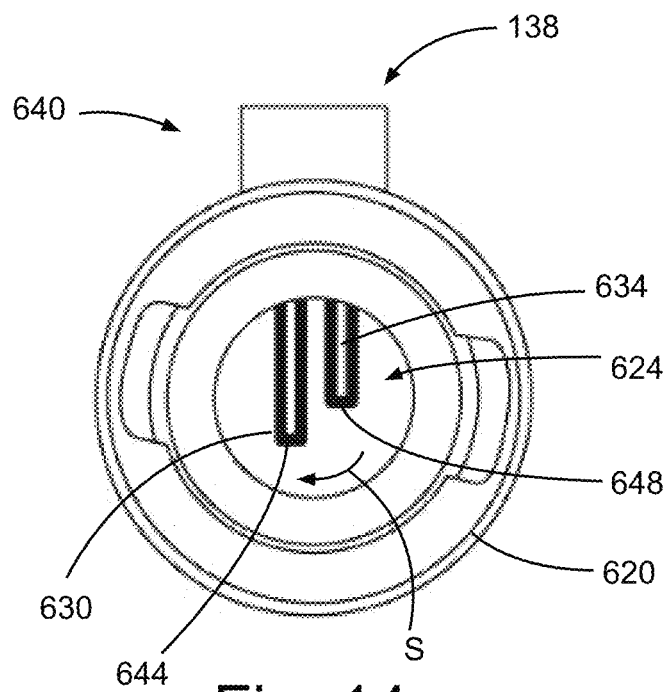

FIGS. 13 and 14 illustrate views of the flavor injector head 138. The flavor injector head is positioned upstream of (e.g., above) the blend cartridge and has a housing 620 defining a passageway 624 extending therethrough. The flavor injector head and blend cartridge may be secured to one another through one or more fasteners. Additionally or alternatively, the flavor injector head and blend cartridge may be held in approximation to one another by the coupling of another/other component(s) of the flavor system.

Extending into the passageway of the flavor injector head 138 are one or more tubes arranged for delivering flavor syrup in the stream of frozen material flowing through the passageway. For example, in the illustrated embodiment a first flavor tube 630 and a second flavor tube 634 extend inwardly into a central portion of the passageway from a periphery of the passageway. The first and second flavor tubes communicate with a flavor port 640 of the flavor injector head.

The flavor tubes have openings 644, 648 positioned at different locations within the passageway of the flavor injector head. In some instances, the flavor tubes may have different lengths extending into the passageway. Applicant has observed that frozen flowable material exiting the spout of the freezer may rotate in a particular direction due to the rotation of the beater in the freezing cylinder/barrel. Preferably the direction of rotation of the mixing vane assembly is counter (e.g., opposite) to the direction of rotation of the frozen flowable material exiting the spout of the freezer.

Additionally or alternatively, the flavor tubes of the flavor injector head are preferably arranged such that mixing vane assembly rotates in a direction away from the openings of the flavor tubes. For example, the mixing vanes may spin in a direction generally away from/out from the shorter flavor tube(s), as shown in FIG. 14 by arrow S. It is believed this rotation can help to draw flavoring out of the flavor tubes and/or reduce the likelihood of frozen flowable material clogging the flavor tubes.

Figure 15:
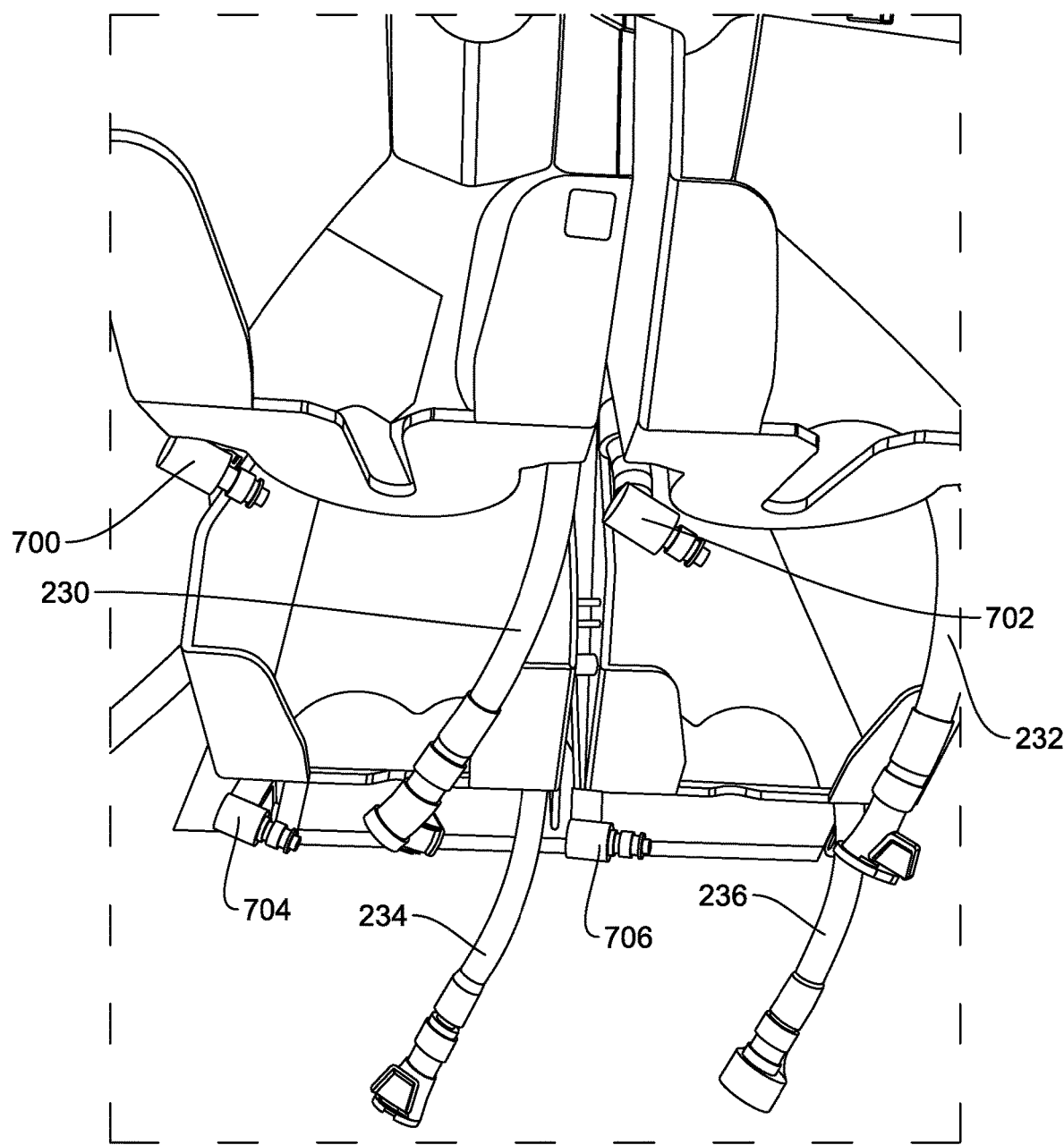
FIG. 15 is a perspective view of sanitizer water lines within the flavor cabinet disconnected from the flavor lines.
Figure 16:
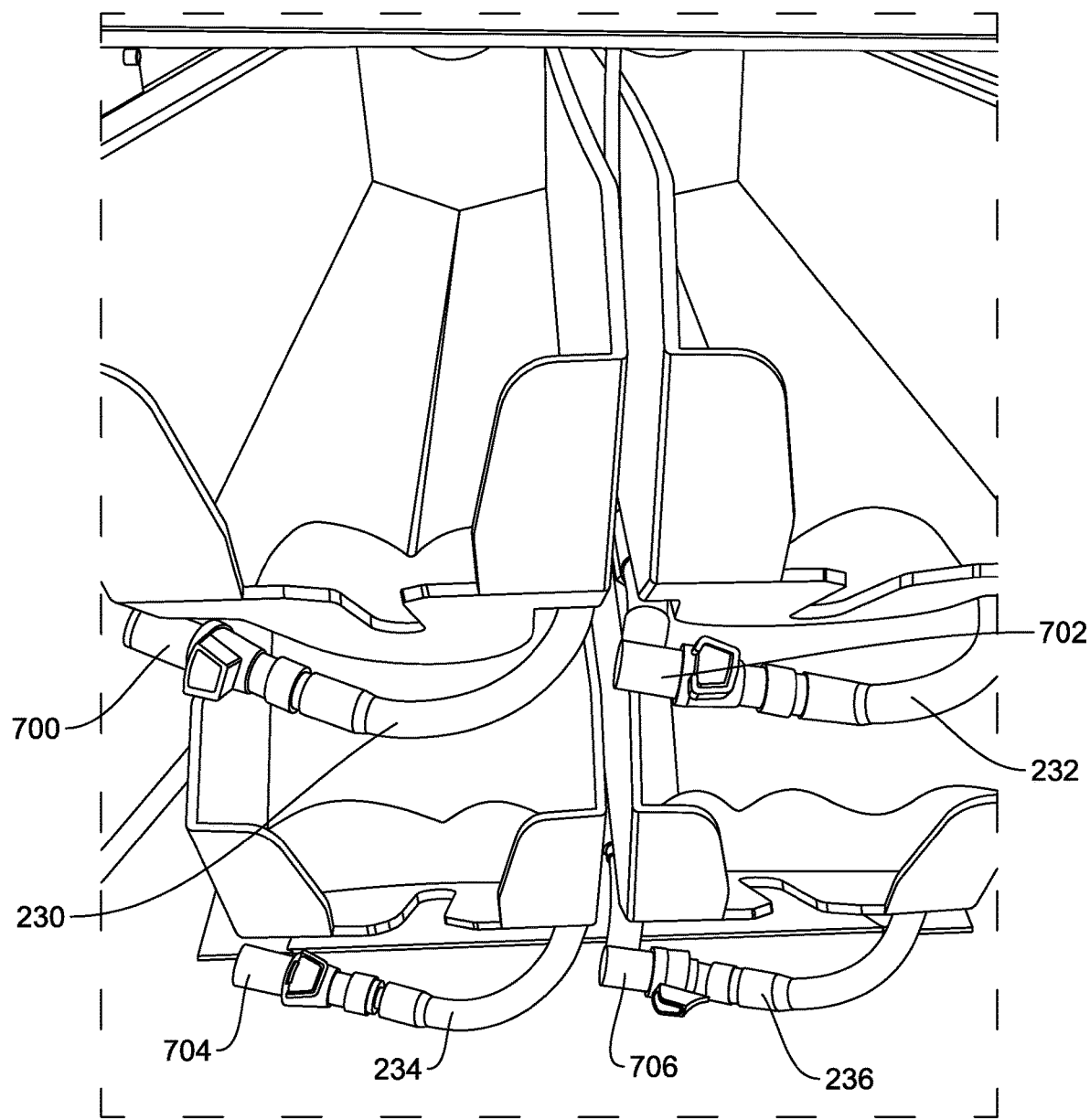
FIG. 16 is a perspective view of sanitizer water lines of FIG. 15 connected to the flavor lines.
Figure 17:
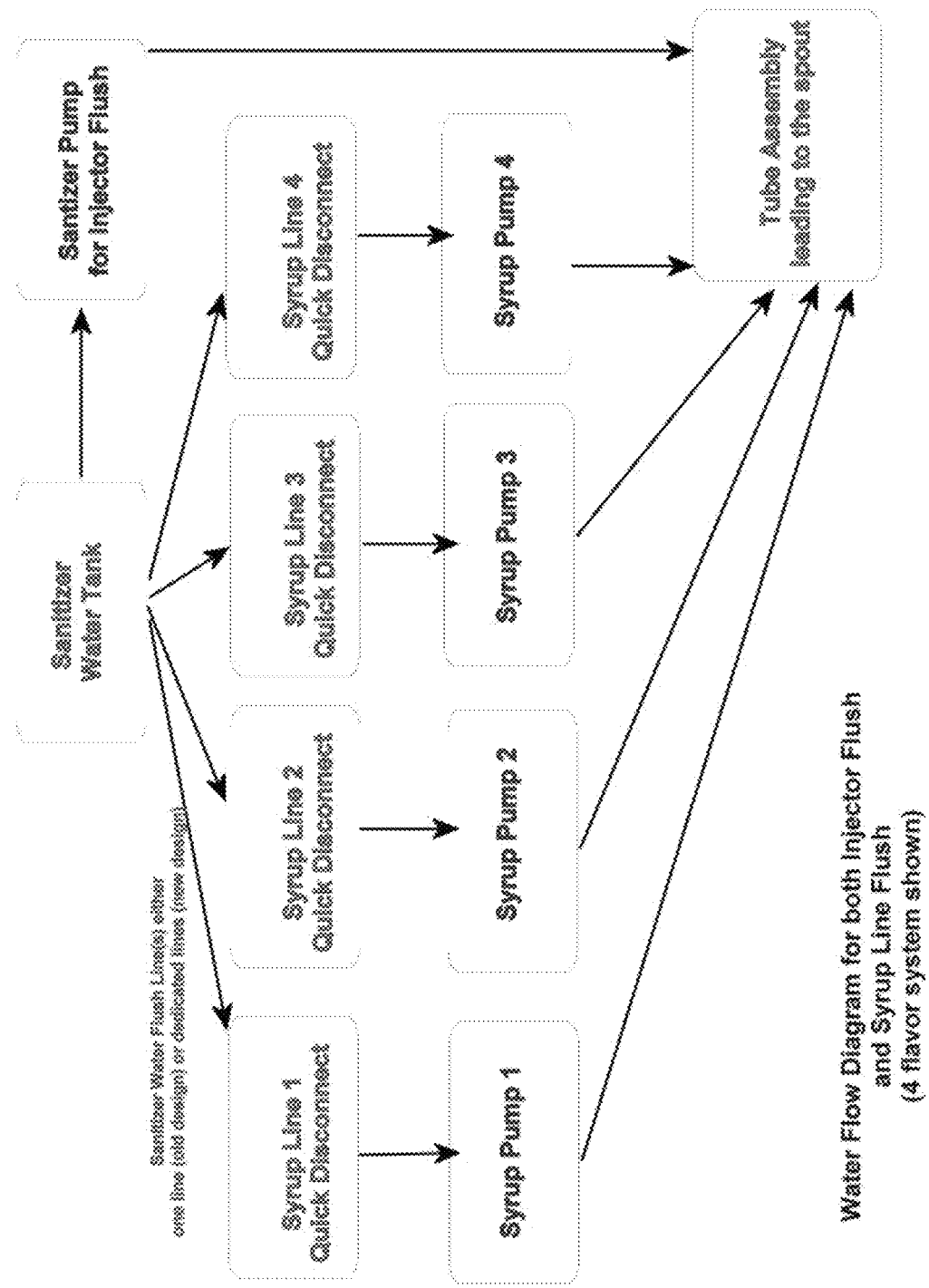
FIG. 17 is a flowchart illustrating the flow of sanitizer water from the water tank through the flavor assembly.

Turning now to FIGS. 15-17, the flavor cabinet of the flavor system may include sanitizer water lines 700, 702, 704, 706 configured and arranged for attachment to the flavor lines. During a sanitizing process of the flavor system, water from the sanitizing system may be flushed through the flavor lines, through the syrup pumps connected to the flavor lines, and into the injector head. FIG. 15 shows the sanitizer water lines disconnected from the flavor lines. FIG. 16 shows the sanitizer water lines connected to the flavor lines.

As will be appreciated by those of ordinary skill in the art, the flavor lines may include additional connectors for connection to the syrup bags. Accordingly, the syrup lines may be connected simultaneously to the sanitizer water lines and the syrup bags. Valves, such as one-way check valves and/or mechanically/electrically actuated valves may be included as well to resist water from the sanitizer water lines from entering the syrup bags and/or the water from the sanitizer water line entering the syrup line during suction of syrup from the syrup bag.

Figure 18:
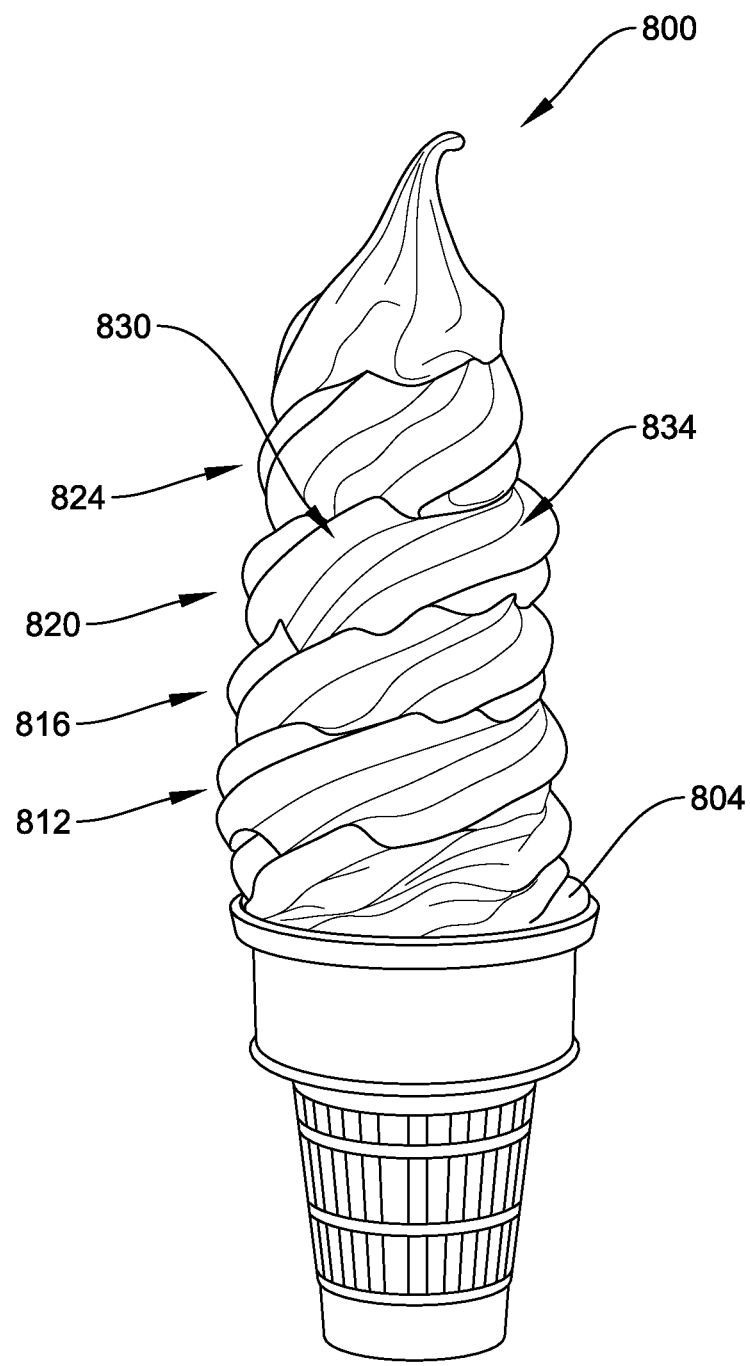
FIG. 18 is a front view of an exemplary ice cream cone formed using a frozen consumable freezer and a flavor system disclosed herein.

FIG. 17 is a flow chart illustrating the flow of sanitizer water from the water tank through the flavor assembly. As described above, each syrup line and syrup pump may be in fluid communication with a sanitizer water line such that the syrup line and pump may receive water during a sanitizing process. Additionally, a sanitizer water line may extend to the flavor injection and blending assembly, such as the injection head and/or the spout adaptor, to provide water directly to the flavor injection and blending assembly during a sanitizing process. In some instances, the sanitizing system is arranged to operate automatically, such as after a predetermined period of time has expired and/or during a particular time and/or day. The sanitizing system may be arranged to operate after a particular syrup line and/or flavor injection and blending assembly has been dormant for a predetermined period of time Advantageously, the systems disclosed herein can extrude a continuous stream of frozen flowable material (i.e., confection) with differing flavor and/or color portions along its length by varying the syrup dispensed from the flavor tubes. FIG. 18 illustrates an exemplary ice cream cone formed using a frozen consumable freezer and a flavor system disclosed herein. The ice cream cone 800 includes a continuous length of frozen flowable material (i.e., confection) 804 formed into a helical configuration having a first layer 812, a second layer 816, a third layer 820, and a fourth layer 824. At least one layer has a different flavor and/or color of another layer. For example, the first layer may be yellow and the second layer may be green. Additionally or alternatively, a layer may transition from a first flavor/color 830 to a second flavor/color 834.

As will be appreciated by one skilled in the art, the flavor system may switch from dispensing one flavor syrup to dispensing another flavor syrup during extrusion of a frozen flowable material. For example, the flavor system may automatically switch from dispensing a first flavor selected prior to extrusion to dispensing a second flavor selected prior to extrusion while frozen flowable material continues to pass through the flavor system. Advantageously, this can enable an operator to form a confection with separate areas of flavor without having to stop the flow of frozen flowable material and/or switch to another spout/nozzle for the second flavor/color.

While the invention has been illustrated and described in detail in the drawings and foregoing description, the same is to be considered as illustrative and not restrictive in character, it being understood that the preferred embodiment has been shown and described and that all changes, equivalents, and modifications that come within the spirit of the inventions are desired to be protected. All publications, patents, and patent applications cited in this specification are herein incorporated by reference as if each individual publication, patent, or patent application were specifically and individually indicated to be incorporated by reference and set forth in its entirety herein.

The language used in the written description is to only have its plain and ordinary meaning, except for terms explicitly defined below. Such plain and ordinary meaning is defined here as inclusive of all consistent dictionary definitions from the most recently published (on the filing date of this document) general purpose Merriam-Webster dictionary.

As used in the specification, the following terms have the following defined meanings:

The term "frozen flowable confections" as used herein includes but is not limited to ice cream, slushes, shakes, smoothies, iced drinks, frozen drinks, soft serve confections, frozen yogurt, gelato, juices, adult alcoholic beverages, and/or any similar frozen flowable material intended to be eaten or drank.

The term "frozen consumable freezer" as used herein includes freezers arranged to freeze and dispense a frozen flowable confections.

The following numbered clauses set out specific embodiments that may be useful in understanding the present invention:

1. A system for forming a frozen flowable confection, comprising:
a frozen consumable freezer; and
a flavor injection and blending assembly attached to the frozen consumable freezer;
wherein the flavor injection and blending assembly includes a blend cartridge having an inner surface defining a confection passageway extending from an inlet end to an outlet end and having a first mixing vane positioned therein;
wherein a lower portion of the inner surface tapers inwardly near the outlet end of the confection passageway to form a nozzle.

2. The system of clause 1, wherein the first mixing vane has a width and the outlet end of the confection passageway has a width less than that of the first mixing vane.

3. The system of any preceding clause, wherein the outlet end of the confection passageway is narrower than any other area of the confection passageway in the flavor injection and blending assembly.

4. The system of any preceding clause, wherein the outlet end of the confection passageway has a circular cross-section.

5. The system of any preceding clause, comprising a cap attachable to the outlet end of the flavor injection and blending assembly and having an opening with a non-circular cross-section.

6. The system of any preceding clause, wherein a screen is positioned between the first mixing vane and the outlet end of the confection passageway.

7. The system of clause 6, wherein a bottom end of the first mixing vane is spaced from a top surface of the screen.

8. The system of any preceding clause, comprising a second mixing vane transverse to and welded to the first mixing vane.

9. The system of clause 8, wherein the first mixing vane has a lower portion defining a slot with a lower portion of the second mixing vane received therein; and
wherein the second mixing vane has an upper portion defining a slot with an upper portion of the first mixing vane received therein.

10. The system of any one of clauses 8-9, wherein the first mixing vane has an elongate opening extending in a first direction relative to a center of the first mixing vane; and
wherein the second mixing vane has an elongate opening extending in a second direction relative to a center of the second mixing vane.

11. The system of clause 10, wherein the elongate opening of the first mixing vane extends upwardly and radially outward from the center of the first mixing vane; and
wherein the elongate opening of the second mixing vane extends downwardly and radially outward from the center of the second mixing vane.

12. The system of any preceding clause, comprising a sanitizing system having a sanitizer tank and pump configured to provide water to the flavor injection and blending assembly.

13. A system for forming a frozen flowable confection, comprising:
a frozen consumable freezer; and
a flavor injection and blending assembly attached to the frozen consumable freezer;
wherein the flavor injection and blending assembly includes a blend cartridge having an inner surface defining a confection passageway extending from an inlet end to an outlet end and having a rotatable mixing vane assembly positioned therein;
  wherein the rotatable mixing vane assembly comprises a first mixing vane and a second mixing vane transverse to one another; and
  wherein the first mixing vane and second mixing vane are welded to one another.

14. The system of clause 13, wherein the first mixing vane has a lower portion defining a slot with a lower portion of the second mixing vane received therein; and
  wherein the second mixing vane has an upper portion defining a slot with an upper portion of the first mixing vane received therein.

15. The system of any one of clauses 13-14, wherein the first mixing vane has an elongate opening extending in a first direction relative to a center of the first mixing vane; and
  wherein the second mixing vane has an elongate opening extending in a second direction relative to a center of the second mixing vane.

16. The system of clause 15, wherein the elongate opening of the first mixing vane extends upwardly and radially outward from the center of the first mixing vane; and
  wherein the elongate opening of the second mixing vane extends downwardly and radially outward from the center of the second mixing vane.

17. The system of any one of clauses 13-16, wherein an outer edge of the first mixing vane and an outer edge of the second mixing vane each engage a gear ring having a plurality of gear teeth extending around a periphery thereof.

18. A system for forming a frozen flowable confection, comprising:
  a frozen consumable freezer;
  a flavor injection and blending assembly attached to the frozen consumable freezer, the flavor injection and blending assembly having an injector head having a flavor tube for supplying flavor syrup into a passageway of the flavor injection and blending assembly; and
  a sanitizing system having a sanitizer tank and pump configured to provide water to the a flavor injection and blending assembly through:
  (a) a water line extending to a spout adaptor of the flavor injection and blending assembly, the spout adaptor positioned between a spout of the frozen consumable freezer and the injector head of the flavor injection and blending assembly;
  (b) a water line extending to the injector head of the flavor injection and blending assembly; and/or
  (c) a water flush line connected to a syrup line extending to the injector head and communicating with the flavor tube.

19. The system of clause 18, wherein the sanitizing system provides water to the flavor injection and blending assembly automatically at a predetermined time of day or after a predetermined period of time.

20. The system of clause 18 or 19, wherein the sanitizing system has a water flush line connected to a syrup line extending to the injector head and communicating with the flavor tube.

The invention claimed is:
1. A system for forming a frozen flowable confection, comprising:
  a frozen consumable freezer; and
  a flavor injection and blending assembly attached to the frozen consumable freezer;
  wherein the flavor injection and blending assembly includes a blend cartridge having an inner surface defining a confection passageway extending from an inlet end to an outlet end and having a first mixing vane positioned therein;
  wherein a lower portion of the inner surface tapers inwardly near the outlet end of the confection passageway to form a nozzle.

2. The system of claim 1, wherein the first mixing vane has a width and the outlet end of the confection passageway has a width less than that of the first mixing vane.

3. The system of claim 1, wherein the outlet end of the confection passageway is narrower than any other area of the confection passageway in the flavor injection and blending assembly.

4. The system of claim 1, wherein the outlet end of the confection passageway has a circular cross-section.

5. The system of claim 1, comprising a cap attachable to the outlet end of the flavor injection and blending assembly and having an opening with a non-circular cross-section.

6. The system of claim 1, wherein a screen is positioned between the first mixing vane and the outlet end of the confection passageway.

7. The system of claim 6, wherein a bottom end of the first mixing vane is spaced from a top surface of the screen.

8. The system of claim 1, comprising a second mixing vane transverse to and welded to the first mixing vane.

9. The system of claim 8, wherein the first mixing vane has a lower portion defining a slot with a lower portion of the second mixing vane received therein; and
  wherein the second mixing vane has an upper portion defining a slot with an upper portion of the first mixing vane received therein.

10. The system of claim 9, wherein the first mixing vane has an elongate opening extending in a first direction relative to a center of the first mixing vane; and
  wherein the second mixing vane has an elongate opening extending in a second direction relative to a center of the second mixing vane.

11. The system of claim 10, wherein the elongate opening of the first mixing vane extends upwardly and radially outward from the center of the first mixing vane; and
  wherein the elongate opening of the second mixing vane extends downwardly and radially outward from the center of the second mixing vane.

12. The system of claim 1, comprising a sanitizing system having a sanitizer tank and pump configured to provide water to the flavor injection and blending assembly.

13. A system for forming a frozen flowable confection, comprising:
  a frozen consumable freezer; and
  a flavor injection and blending assembly attached to the frozen consumable freezer;
  wherein the flavor injection and blending assembly includes a blend cartridge having an inner surface defining a confection passageway extending from an inlet end to an outlet end and having a rotatable mixing vane assembly positioned therein;
  wherein the rotatable mixing vane assembly comprises a first mixing vane and a second mixing vane transverse to one another; and
  wherein the first mixing vane and second mixing vane are welded to one another.

14. The system of claim 13, wherein the first mixing vane has a lower portion defining a slot with a lower portion of the second mixing vane received therein; and
  wherein the second mixing vane has an upper portion defining a slot with an upper portion of the first mixing vane received therein.

15. The system of claim 13, wherein the first mixing vane has an elongate opening extending in a first direction relative to a center of the first mixing vane; and wherein the second mixing vane has an elongate opening extending in a second direction relative to a center of the second mixing vane.

16. The system of claim 15, wherein the elongate opening of the first mixing vane extends upwardly and radially outward from the center of the first mixing vane; and wherein the elongate opening of the second mixing vane extends downwardly and radially outward from the center of the second mixing vane.

17. The system of claim 13, wherein an outer edge of the first mixing vane and an outer edge of the second mixing vane each engage a gear ring having a plurality of gear teeth extending around a periphery thereof.

18. A system for forming a frozen flowable confection, comprising:

a frozen consumable freezer;

a flavor injection and blending assembly attached to the frozen consumable freezer, the flavor injection and blending assembly having an injector head having a flavor tube for supplying flavor syrup into a passageway of the flavor injection and blending assembly; and a sanitizing system having a sanitizer tank and pump configured to provide water to the a flavor injection and blending assembly through:

(a) a water line extending to a spout adaptor of the flavor injection and blending assembly, the spout adaptor positioned between a spout of the frozen consumable freezer and the injector head of the flavor injection and blending assembly;

(b) a water line extending to the injector head of the flavor injection and blending assembly; and/or (c) a water flush line connected to a syrup line extending to the injector head and communicating with the flavor tube.

19. The system of claim 18, wherein the sanitizing system provides water to the flavor injection and blending assembly automatically at a predetermined time of day or after a predetermined period of time.

20. The system of claim 18, wherein the sanitizing system has a water flush line connected to a syrup line extending to the injector head and communicating with the flavor tube.

* * * * *